United States Patent

Süling, et al.

[15] 3,644,265

[45] Feb. 22, 1972

[54] STABILIZED SOLUTIONS OF ACRYLONITRILE-VINYLIDENE CHLORIDE COPOLYMERS

[72] Inventors: Carlhans Süling, Odenthal-Hahnenberg; Heino Logemann; Dieter Kramer, both of Leverkusen; Heinz Rachwalsky; Herbert Marzolph, both of Dormagen, all of Germany

[73] Assignee: Farbenfabriken Bayer Aktiengesellschaft, Leverkusen, Germany

[22] Filed: Dec. 6, 1968

[21] Appl. No.: 781,957

[30] Foreign Application Priority Data

Dec. 15, 1967 Germany ........................ P 16 94 233.9

[52] U.S. Cl. ..............260/32.6 N, 260/45.7 SU, 260/45.9 R, 260/88.5 X

[51] Int. Cl. ........................................................C08f 45/60

[58] Field of Search .....................260/45.9, 45.7 SU, 88.5 X, 260/32.6 N

[56] References Cited

UNITED STATES PATENTS 3,436,364 4/1969 Logemann ............................260/32.6

*Primary Examiner*—Morris Liebman
*Assistant Examiner*—Richard Zaitlen
*Attorney*—Plumley, Tyner & Sandt

[57] ABSTRACT

This invention relates to a stabilized solution of a copolymer from acrylonitrile and vinylidene chloride in an organic solvent, the chlorine content of the copolymer is in the range from 20 to 60 percent by weight based on the polymer. The solution of the copolymer contains a salt of a mercapto sulphonic acid with a guanidine as stabilizing agent, said salt is present in the solvent in the range of from 0.001 to 5 percent by weight based on the polymer.

5 Claims, No Drawings

STABILIZED SOLUTIONS OF ACRYLONITRILE-VINYLIDENE CHLORIDE COPOLYMERS

This invention relates to stabilized solutions of copolymers of acrylonitrile and vinylidene chloride containing guanidinium salts of mercaptosulphonic acids as stabilizers.

Several stabilizers have been proposed for polyacrylonitrile and copolymers of acrylonitrile containing more than 80 percent by weight of acrylonitrile. These stabilizers are intended to protect fibers and films produced from these materials against discoloration under the influence of elevated temperatures. Such discoloration can be observed even during the preparation of the fibers and films, for example during the preparation of the spinning solutions, during the process of spinning itself, and during fixing and crimping of the fibers.

Unfortunately, conventional stabilizers cannot be used to protect fibers and film of copolymers of acrylonitrile with vinylidene chloride containing from 20 to 60 percent by weight of chlorine against discoloration under the effect of heat, because it has been found in the stabilization of acrylonitrile-vinylidene chloride copolymers against discoloration that the effectiveness of a stabilizer is governed not only by the composition of the copolymer, but by the structure of the copolymer, by the processing conditions, and by the type of solvent used.

Similarly, the numerous stabilizers and stabilizer combinations that have been proposed for moldings of pure polyvinyl chloride and polyvinylidene chloride and for moldings based on copolymers having a large vinyl or vinylidene component, in particular for thick-walled extruded and molded products, are unsuitable for the production of fibers and films from copolymers of acrylonitrile with vinylidene chloride.

Copolymers of acrylonitrile with vinylidene chloride containing at least 20 percent by weight of chlorine differ from copolymers of acrylonitrile containing at least 80 percent by weight of combined acrylonitrile in some highly characteristic respects. For example, it is impossible to obtain homogenous solutions in dimethyl formamide from a mixture of an acrylonitrile-vinylidene chloride copolymer (30 percent by weight of chlorine) and an acrylonitrile polymer containing at least 80 percent by weight of combined acrylonitrile. The two copolymers are each individually soluble in dimethyl formamide, forming clear solutions. Unfortunately, their solutions in dimethyl formamide cannot be mixed together without giving rise to the formation of two phases, nor can a mixture of the two polymers be dissolved without the formation of two phases. The limit at which the polymers are incompatible with one another in solution in dimethyl formamide, lies very distinctly at a content of approximately 28 percent by weight of combined vinylidene chloride. Polymers of vinylidene chloride alone and also those containing a small amount of a comonomer are insoluble in all solvents, even during their preparation. The difference in the structure of the three types of copolymers, as shown in their solubility properties, explains why the decomposition reactions which are initiated at elevated temperatures differ fundamentally with each type of copolymer and are inhibited by different types of stabilizers.

Various forms of mercaptans, in particular, have been proposed as stabilizers for polyacrylonitrile and for copolymers of acrylonitrile containing more than 80 percent by weight of acrylonitrile. In order to suppress the inevitable mercaptan odor that would be given off during preparation of the fibers, mercaptans with high boiling point have preferably been used as stabilizers. It is known, for example, that hydroxythiols may be used as stabilizers in the production of spinning solutions, with ethylene carbonate for example as the solvent. Thioglycolic esters have also been used. Acrylonitrile copolymers have also been prepared in dimethyl sulphoxide in the presence of dodecyl mercaptan, and subsequently stabilized by the addition of sulphur dioxide and dodecyl mercaptan. It is also known that butyl mercaptan, dithioglycerol, thiosorbitol and dodecyl mercaptan may be used as stabilizers for solutions of polyacrylonitrile in dimethyl formamide. It is also known that the stabilizing effect of mercaptans, in particular hydroxy mercaptans such as thiosorbitol, on solutions in dimethyl formamide of polyacrylonitrile and copolymers containing more than 85 percent by weight of acrylonitrile, can be considerably intensified by the addition of an acid anhydride, sulphuric acid or sulphonic acids.

Conspicuously, the mercaptans have also been used as effective stabilizers for copolymers of acrylonitrile and vinylidene chloride. For example, a combination of thioglycolic acid or thioglycol with dibutyl tin laurate has been proposed as stabilizer for acrylonitrile copolymers containing vinyl chloride or vinylidene chloride.

Unfortunately, one disadvantage common to all these stabilizers and stabilizer combinations is that a characteristic mercaptan odor consistently effects the spun and after treated fibers. The odor is not even eliminated by intensively washing the fibers. Even when the almost involatile hydroxy mercaptans are used, the odor given off during production of the fibers is particularly pungent.

The present invention provides stabilized solutions in organic solvents of copolymers of acrylonitrile and vinylidene chloride with a chlorine content of from 20 to 60 percent by weight, based on the polymer, which contains from 0.001 to 5 percent by weight, based on the polymer, of salts of mercapto sulphonic acids with guanidines.

No pungent odors are given off during the preparation and further processing of these solutions.

Suitable solvents for the chlorine-containing acrylonitrile copolymers include highly polar solvents, for example dimethyl formamide, dimethyl acetamide or acetone. The polymer content of the solution amounts to between 5 and 55 percent by weight and preferably to between 10 and 30 percent by weight. The alkali metal and heavy metal salts of mercapto sulphonic acids are usually almost insoluble in such solvents as these. The free mercapto sulphonic acids cannot be obtained sufficiently pure on a large scale.

By contrast, the guanidinium salts of these sulphonic acids used in accordance with the invention may readily be obtained in known manner in high yields and in a highly pure form by splitting the corresponding thiuronium compounds with ammonia or with amines. Both the salts of guanidine itself and the salts of substituted guanidines are highly soluble in the polar solvents in question, and are suitable for use as stabilizers in accordance with the invention. It is possible by using them to obtain solutions of the copolymers of acrylonitrile and vinylidene chloride with a chlorine content of from 20 to 60 percent by weight which are highly stable, which do not exhibit pungent odors during preparation, and which give fibers and films completely free of the mercaptan odor. It is preferred to use the guanidinium salt of $\beta$-mercapto ethane sulphonic acid.

The stabilizer is added to the solutions in a quantity of from 0.001 to 5 percent by weight, and preferably in a quantity of from 0.1 to 2 percent by weight, based on the polymer. The action of the stabilizer may be improved somewhat by the addition of a small quantity of an acid such as sulphuric acid or sulphonic acids, preferably 0.1 to 0.2 percent by weight of p-toluene sulphonic acid.

The following Examples illustrate more particularly the invention.

EXAMPLE 1

Ten percent by weight solutions in dimethyl formamide are prepared from a copolymer of 60 parts by weight of acrylonitrile and 40 parts by weight of vinylidene chloride in the presence and absence of the additives specified in the Table, the quantities being in percentages by weight, based on polymer. The solutions are heated in a thermostat for 30 minutes at 110° C., and quickly cooled and their extinction values measured in an Elko Photometer, (a Zeiss product) at the wavelengths specified. The *E/d* values are set out in Table I.

The figures show that the discoloration of the polymer solution at a temperature of 110° C. is suppressed, by adding

TABLE I

| λ= | 450 mμ | 470 mμ | 530 mμ | 620 mμ |
|---|---|---|---|---|
| No addition | 0.108 | 0.084 | 0.028 | 0.008 |
| With 0.5% by weight $CH_2OH \cdot CHOH \cdot CH_2SH$ = 4.63 mmol percent | 0.059 | 0.043 | 0.014 | 0.003 |
| With 1% by weight $CH_2OH \cdot CHOH \cdot CH_2SH$ = 9.26 mmol percent | 0.051 | 0.038 | 0.012 | 0.003 |
| With 0.36% by weight $CH_2OH \cdot CH_2SH$ = 4.63 mmol percent | 0.056 | 0.042 | 0.014 | 0.004 |
| With 0.72% by weight $CH_2OH \cdot CH_2SH$ = 9.26 mmol percent | 0.054 | 0.039 | 0.013 | 0.003 |
| With 0.47% by weight $HS \cdot CH_2CH_2SO_3H \cdot HN{=}C(NH_2)_2$ = 2.32 mmol percent | 0.057 | 0.042 | 0.013 | 0.003 |
| With 0.93% by weight $HS \cdot CH_2CH_2SO_3H \cdot HN{=}C(NH_2)_2$ = 4.63 mmol percent | 0.053 | 0.038 | 0.011 | 0.003 |
| With 1.86% by weight $HS \cdot CH_2CH_2SO_3H \cdot HN{=}C(NH_2)_2$ = 9.26 mmol percent | 0.047 | 0.034 | 0.008 | 0.002 |
| With 0.47% by weight $HS \cdot CH_2CH_2SO_3H \cdot HN{=}C(NH_2)_2$ = 2.32 mmol percent plus 0.2% by weight $CH_3{-}C_6H_4{-}SO_3H \cdot H_2O$ | 0.042 | 0.031 | 0.008 | 0.002 |
| With 0.93% by weight $HS \cdot CH_2CH_2SO_3H \cdot HN{=}C(NH_2)_2$ = 4.63 mmol percent plus 0.2% by weight $CH_3{-}C_6H_4{-}SO_3H \cdot H_2O$ | 0.044 | 0.032 | 0.008 | 0.002 |
| With 1.86% by weight $HS \cdot CH_2CH_2SO_3H \cdot HN{=}C(NH_2)_2$ = 9.26 mmol percent plus 0.2% by weight $CH_3{-}C_6H_4{-}SO_3H \cdot H_2O$ | 0.048 | 0.035 | 0.009 | 0.003 |
| With 0.47% by weight $HS \cdot CH_2CH_2SO_3H \cdot HN{=}C(NH_2)_2$ = 2.32 mmol percent plus 0.05% by weight $CH_3{-}C_6H_4{-}SO_3H \cdot H_2O$ | 0.057 | 0.042 | 0.012 | 0.003 |
| With 0.47% by weight $HS \cdot CH_2CH_2SO_3H \cdot HN{+}C(NH_2)_2$ = 2.32 mmol percent plus 0.1% by weight $CH_3{-}C_6H_4{-}SO_3H \cdot H_2O$ | 0.051 | 0.038 | 0.011 | 0.003 |
| With 0.47% by weight $HS \cdot CH_2CH_2SO_3H \cdot HN{=}C(NH_2)_2$ = 2.32 mmol percent plus 0.4% by weight $CH_3{-}C_6H_4{-}SO_3H \cdot H_2O$ | 0.046 | 0.035 | 0.008 | 0.003 |
| With 0.05% by weight $CH_3{-}C_6H_4{-}SO_3H \cdot H_2O$ | 0.110 | 0.091 | 0.032 | 0.008 |
| With 0.1% by weight $CH_3{-}C_6H_4{-}SO_3H \cdot H_2O$ | 0.106 | 0.088 | 0.031 | 0.008 |

TABLE I – Continued

| λ= | 450 mμ | 470 mμ | 530 mμ | 620 mμ |
|---|---|---|---|---|
| With 0.2% by weight $CH_3-C_6H_4-SO_3H\cdot H_2O$ | 0.098 | 0.082 | 0.027 | 0.006 |
| With 0.4% by weight $CH_3-C_6H_4-SO_3H\cdot H_2O$ | 0.105 | 0.192 | 0.030 | 0.006 |

TABLE II

| | 450 mμ | 470 mμ | 530 mμ | 620 mμ |
|---|---|---|---|---|
| No addition | 0.273 | 0.219 | 0.087 | 0.029 |
| With 0.5% by weight $CH_2OH\cdot CHOH\cdot CH_2SH$ (=4.63 mmol percent) | 0.134 | 0.101 | 0.032 | 0.010 |
| With 1% by weight $CH_2OH\cdot CHOH\cdot CH_2SH$ (=9.26 mmol percent) | 0.104 | 0.080 | 0.023 | 0.006 |
| With 0.5% by weight $CH_2OH\cdot CHOH\cdot CH_2SH$ (=4.63 mmol percent) plus 0.25% by weight $CH_3-C_6H_4-SO_3H\cdot H_2O$ | 0.109 | 0.086 | 0.024 | 0.007 |
| With 0.93% by weight $HS\cdot CH_2CH_2SO_3H\cdot HN{=}C(NH_2)(NH_2)$ (=4.63 mmol percent) | 0.093 | 0.070 | 0.023 | 0.008 |
| With 1.86% by weight $HS\cdot CH_2CH_2SO_3H\cdot HN{=}C(NH_2)(CH_2)$ (=9.25 mmol percent) | 0.080 | 0.065 | 0.020 | 0.007 |
| With 0.93% by weight $HS\cdot CH_2CH_2SO_3H\cdot HN{=}C(NH_2)(NH_2)$ (=4.63 mmol) plus 0.25% by weight $CH_3-C_6H_4-SO_3H\cdot H_2O$ | 0.087 | 0.064 | 0.020 | 0.007 |

guanidine 2-mercapto ethane sulphonic acid, by at least the same extent as is achieved by the addition of an equivalent quantity of thioglycerol or thioglycol. An addition of p-toluene sulphonic acid, which is itself ineffective, in a quantity in excess of about 0.1 percent by weight provides a further distinct improvement. The solutions containing guanidine 2-mercapto ethane sulphonic acid are completely odorless, while solutions containing thioglycerol or thioglycol have an extremely unpleasant odor.

EXAMPLE 2

Twenty-five percent by weight solutions in dimethyl formamide are prepared from a copolymer of 60 parts by weight of acrylonitrile and 40 parts by weight of vinylidene chloride in the presence and absence of the additives specified in the Table, the quantities being in percentages by weight, based on the polymer. The solutions are heated for 30 minutes in a thermostat at 110° C. and quickly cooled. They are diluted to 15 percent by weight and heated for 2 hours at 60° C., and their extinction values are measured in an Elko Photometer, (a Zeiss product) at the wavelength specified. The *E/d* values for the 25 percent by weight solution, calculated from the values measured on the 15 percent by weight solution, are set out in Table II.

The figures show that the discoloration of the polymer solution at a temperature of 110° C. is suppressed by adding guanidine 2-mercaptoethane sulphonic acid by at least the same extent as is achieved by the addition of an equivalent quantity of thioglycerol. A further addition of p-toluene sulphonic acid provides a further improvement. The solutions containing guanidine 2-mercapto ethane sulphonic acid as stabilizer, are completely odorless, while the solutions containing thioglycerol have an extremely unpleasant odor.

What is claimed is:

1. A stabilized solution of a copolymer of acrylonitrile and vinylidene chloride having a chlorine content of from 20 to 60 percent by weight, based on the polymer, in an organic solvent, said solution containing from 0.001 to 5 percent by weight, based on the polymer, of a stabilizing agent comprising a salt of a mercapto sulfonic acid and a guanidine.

2. The stabilized solution of a copolymer of acrylonitrile and vinylidene chloride of claim 1, wherein said sulfonic acid is 2-mercaptoethane sulfonic acid.

3. A stabilized solution of a copolymer of acrylonitrile and vinylidene chloride having a chlorine content of from 20 to 60 percent by weight, based on the polymer, in an organic solvent, said solution containing from 0.001 to 5 percent by weight, based on the polymer, of a salt of a mercapto sulfonic acid with a guanidine and 0.1 to 0.2 percent by weight of a material selected from the group consisting of sulfuric acid and sulfonic acid.

4. The stabilized solution of a copolymer of acrylonitrile and vinylidene chloride of claim 3, wherein said sulfuric acid is p-toluene sulfuric acid.

5. The stabilized solution of claim 1 in which the stabilizing agent is present in proportions of 0.1 to 2 percent by weight.

* * * * *